(12) United States Patent
Huang (10) Patent No.: US 10,030,629 B2
(45) Date of Patent: Jul. 24, 2018

(54) WIND TURBINE BLADE ASSEMBLY

(71) Applicant: Kuo-Chang Huang, Tainan (TW)

(72) Inventor: Kuo-Chang Huang, Tainan (TW)

( * ) Notice: Subject to any disclaimer, the term of this patent is extended or adjusted under 35 U.S.C. 154(b) by 253 days.

(21) Appl. No.: 14/978,564

(22) Filed: Dec. 22, 2015

(65) Prior Publication Data

US 2016/0186721 A1  Jun. 30, 2016

(30) Foreign Application Priority Data

Dec. 25, 2014  (TW) .............................. 103222947 U (51) Int. Cl.
*F03D 3/06*  (2006.01)
(52) U.S. Cl.
CPC ............. *F03D 3/062* (2013.01); *F03D 3/067* (2013.01); *F05B 2240/211* (2013.01); *Y02E 10/74* (2013.01)

(58) Field of Classification Search
CPC ......... F03D 3/062; F03D 3/067; Y02E 10/74; F05B 2240/211
See application file for complete search history.

(56) References Cited

U.S. PATENT DOCUMENTS

| | | | | |
|---|---|---|---|---|
| 1,352,952 A * | 9/1920 | Gracey | ................... | F03D 3/067 416/118 |
| 1,364,681 A * | 1/1921 | Barto | ....................... | F03D 3/067 416/117 |
| 4,329,593 A * | 5/1982 | Willmouth | .............. | F03D 3/065 290/44 |
| 4,419,587 A * | 12/1983 | Benton | .................... | F03D 3/065 290/44 |
| 4,508,972 A * | 4/1985 | Willmouth | .............. | F03D 9/255 290/42 |
| 4,684,817 A * | 8/1987 | Goldwater | .............. | F03D 3/067 290/55 |
| 7,077,628 B1 * | 7/2006 | Acord | ..................... | F03D 3/067 415/4.2 |
| 8,177,481 B2 * | 5/2012 | Liang | ...................... | F03D 3/067 415/4.2 |
| 8,702,393 B2 * | 4/2014 | Al-Azzawi | ............. | F03D 3/068 416/132 A |
| 9,194,367 B1 * | 11/2015 | Feldhaus | ................. | F03D 3/067 |
| 2004/0057829 A1 * | 3/2004 | Khan | ...................... | F03D 3/067 416/17 |

(Continued)

FOREIGN PATENT DOCUMENTS

| | | | | | |
|---|---|---|---|---|---|
| DE | 9311831 U1 * | 1/1994 | ............. | F03D 3/067 |
| FR | 2538040 A1 * | 6/1984 | ............. | F03D 3/067 |
| TW | M485960 U | 9/2014 | | |

*Primary Examiner* — Eldon Brockman
(74) *Attorney, Agent, or Firm* — Muncy, Geissler, Olds & Lowe, P.C.

(57) ABSTRACT

A wind turbine blade assembly includes a rotary shaft, and a plurality of blade units connected to the rotary shaft and angularly spaced apart from each other. Each blade unit includes a grid frame connected to the rotary shaft and formed with a plurality of grid spaces, a plurality of blade panels swingably connected to the grid frame and corresponding in position to the grid spaces, and a plurality of counterweight members respectively disposed on the swing ends of the blade panels. Each counterweight member includes a soft hollow main body and a counterweight fluid accommodated in the main body.

7 Claims, 7 Drawing Sheets

(56) References Cited

U.S. PATENT DOCUMENTS

| | | | |
|---|---|---|---|
| 2009/0066088 A1* | 3/2009 | Liang | F03D 3/067 290/55 |
| 2009/0179112 A1* | 7/2009 | Gu | B32B 27/12 244/153 R |
| 2012/0195759 A1* | 8/2012 | Feldhaus | F03D 3/067 416/117 |
| 2016/0281507 A1* | 9/2016 | Tso | F03B 17/065 |

* cited by examiner

WIND TURBINE BLADE ASSEMBLY

CROSS-REFERENCE TO RELATED APPLICATION

This application claims priority of Taiwanese Application No. 103222947, filed on Dec. 25, 2014.

FIELD

The disclosure relates to a blade assembly, and more particularly to a wind turbine blade assembly.

BACKGROUND

A vane device for a wind turbine apparatus, as disclosed in Taiwanese Patent No. M485960, includes a rotary shaft, and a plurality of vane units connected to the rotary shaft and angularly spaced apart from each other. Each vane unit includes a grid frame connected to the rotary shaft, a plurality of vanes swingably connected to the grid frame, and a plurality of counterweight members each of which is disposed on one end of a respective one of the vanes. When one of the vane units is in the upwind position, the vanes of the one of the vane unit are in a cover position to generate a rotational torque. Meanwhile, the other vane units are in the downwind position and the vanes thereof are in an open position, thereby generating a reverse rotational torque. By virtue of the structural arrangement of the vane device, the rotational torque is greater than the reverse rotational torque, thereby enhancing use efficiency of wind power.

Because the vane device is exposed to sunlight and outdoor weathering conditions, the vanes are easily damaged so that it is inevitable that the damaged vane and the counterweight member will fall or the counterweight member itself will drop from the damaged vane to cause injury to the people passing by. Hence, the aforesaid vane device is not safe to use.

SUMMARY

Therefore, an object of the disclosure is to provide a wind turbine blade assembly that is capable of enhancing safety of use.

According to the disclosure, a wind turbine blade assembly includes a rotary shaft extending along an axis and rotatable in a rotational direction about the axis, and a plurality of blade units connected to the rotary shaft and angularly spaced apart from each other. Each of the blade units includes a grid frame, a plurality of blade panels and a plurality of counterweight members. The grid frame is connected to the rotary shaft and is formed with a plurality of grid spaces. The blade panels are swingably connected to the grid frame and are corresponding in position to the grid spaces. Each of the blade panels has a connecting end connected to the grid frame, and a swing end opposite to the connecting end. Each of the blade panels is swingable between a cover position, where each of the blade panels covers a respective one of the grid spaces and the swing end of each of the blade panels abuts against the grid frame, and an open position, where the swing end of each of the blade panels is moved away from the grid frame to uncover the respective one of the grid spaces. The counterweight members are respectively disposed on the swing ends of the blade panels. Each of the counterweight members includes a soft hollow main body and a counterweight fluid accommodated in the main body.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Before the disclosure is described in greater detail, it should be noted that like elements are denoted by the same reference numerals throughout the disclosure.

Referring to FIGS. 1 to 4, a wind turbine blade assembly according to a first embodiment of the present disclosure includes a rotary shaft 1 and a plurality of blade units 2.

Figure 1:
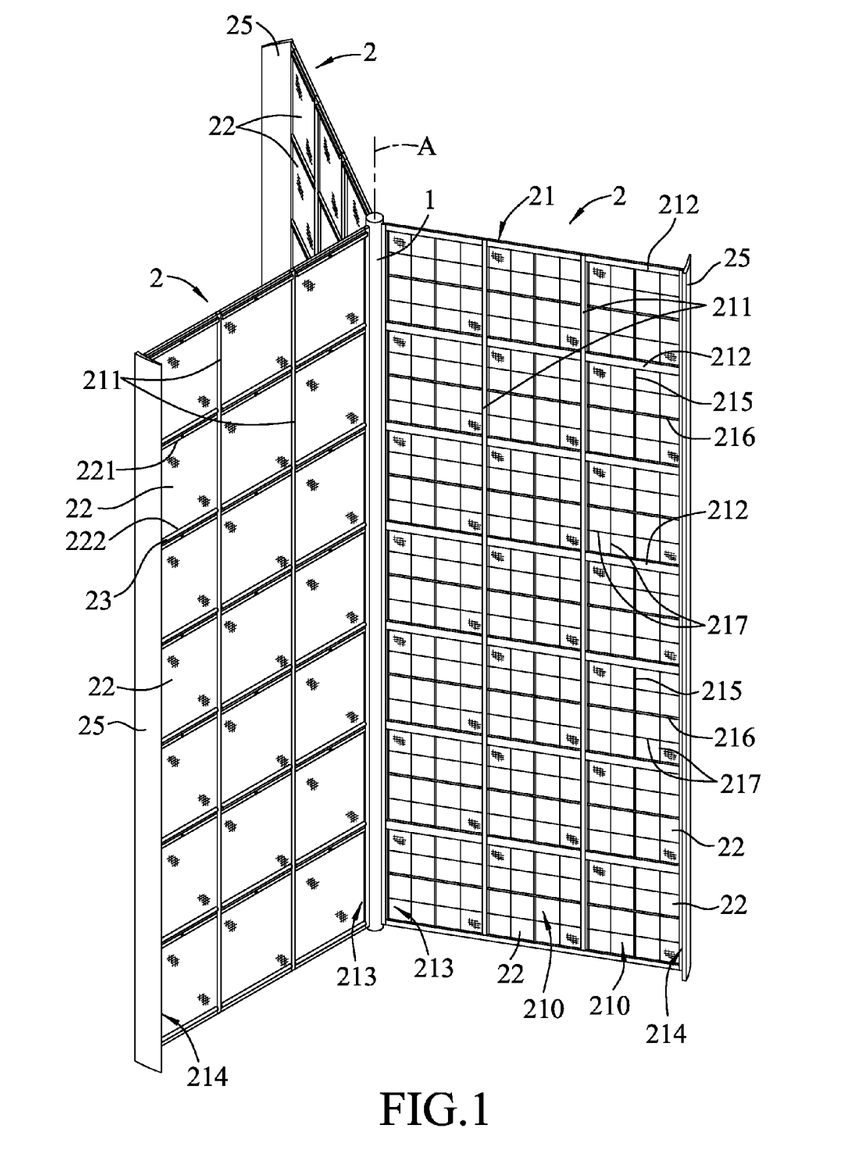
FIG. 1 is a perspective view of a wind turbine blade assembly according to a first embodiment of the present disclosure, illustrating blade panels of all blade units thereof in a cover position.
Figure 2:
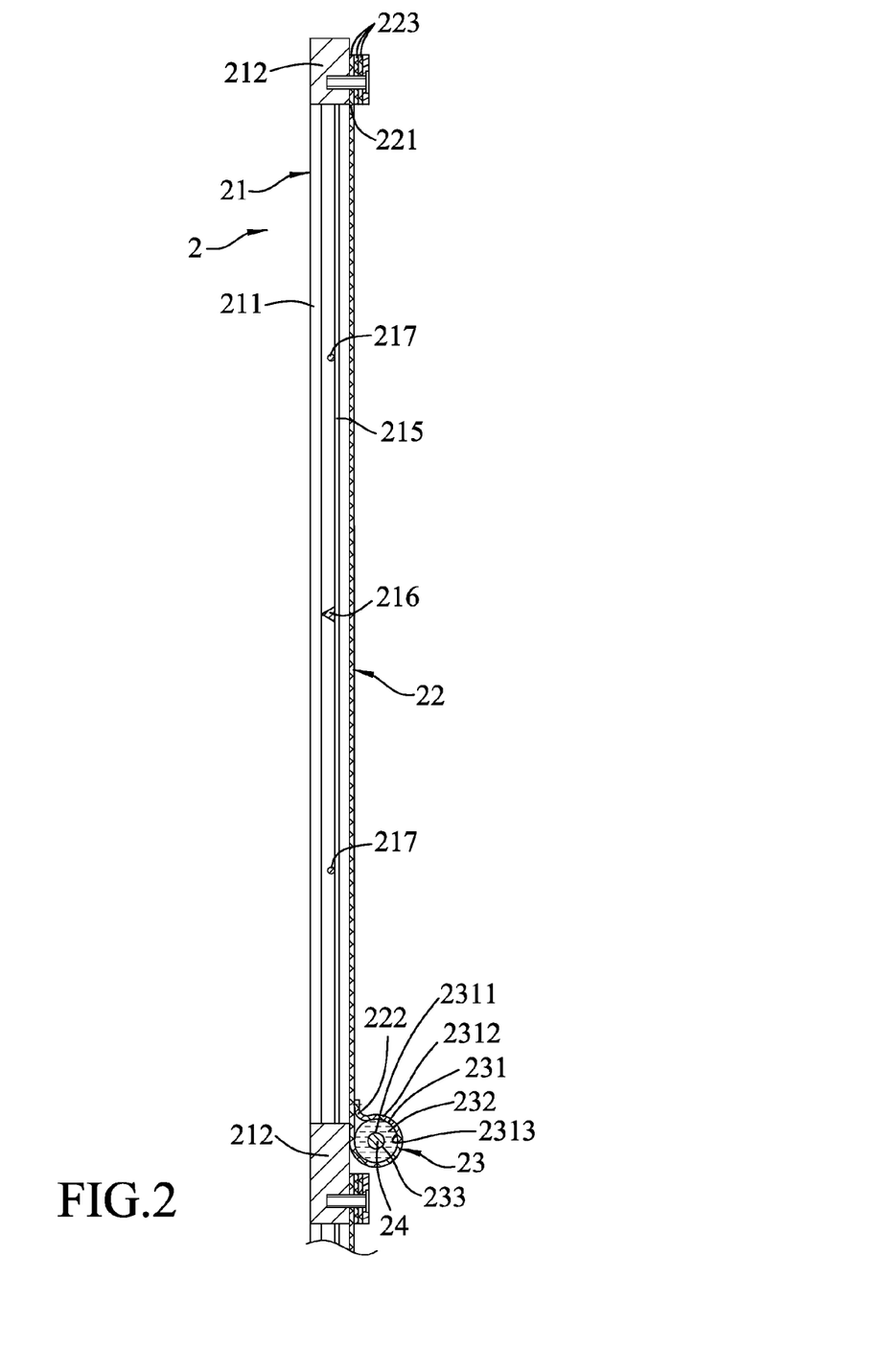
FIG. 2 is a partly sectional view of the first embodiment.

The rotary shaft 1 extends along an axis (A) and is rotatable in a rotational direction (T) about the axis (A). In this embodiment, the axis (A) is vertical, and the rotary shaft 1 is an elongated hollow shaft that is mounted to a mount device (not shown) so as to be lifted from the ground. Since the rotary shaft 1 extends vertically, the wind turbine blade assembly of this disclosure is a vertical wind turbine blade assembly.

The blade units 2 are connected to the rotary shaft 1 and are angularly spaced apart from each other. Each of the blade units 2 includes a grid frame 21, a plurality of blade panels 22, a plurality of counterweight members 23, a plurality of supporting members 24, and a wind-guiding plate 25.

In this embodiment, there are three blade units 2. The grid frames 21 of the blade units 2 are spaced 120 degrees apart from each other. The grid frame 21 of each blade unit 2 includes a plurality of first grid rods 211 that extend in a direction parallel to the rotary shaft 1 and that are spaced apart from each other in a radial direction with respect to the axis (A), and a plurality of second grid rods 212 that extend in the radial direction with respect to the axis (A) and that are spaced apart from each other in an axial direction with respect to the axis (A). The first grid rods 211 and the second grid rods 212 intersect each other and cooperatively define a plurality of grid spaces 210. An innermost one of the first grid rods 211 serves as an inner end 213 of the grid frame 21 which is connected to the rotary shaft 1, and an outermost one of the first grid rods 211 which is distal from the rotary shaft 1 serves as an outer end 214 of the grid frame 21.

Moreover, the grid frame 21 of each blade unit 2 further includes a plurality of first and second struts 215, 216, and a plurality of auxiliary ribs 217. Each of the first struts 215 and a respective one of the second struts 216 are disposed in a corresponding one of the grid spaces 210. Each first strut 215 intersects the respective one of the second struts 216. Specifically, each grid space 210 is provided with the intersecting first and second struts 215, 216. Each first strut 215 is parallel to and spaced apart from the rotary shaft 1, and is fixed between two adjacent ones of the second grid rods 212. Each second strut 216 is elongated in the radial direction with respect to the axis (A), and is fixed between two adjacent ones of the first grid rods 211. Four auxiliary ribs 217 are disposed in each grid space 210, one of which is disposed between one of the second grid rods 212 and the second strut 216, a second one of which is disposed between the other second grid rod 212 and the second strut 216, a third one of which is disposed between one of the first grid rods 211 and the first strut 215, and a fourth one of which is disposed between the other first grid rod 211 and the first strut 215. The first and second auxiliary ribs 217 intersect with the third and fourth auxiliary ribs 217. Each of the auxiliary ribs 217 has a diameter smaller than that of each of the first and second struts 215, 216.

In this embodiment, the blade panels 22 of each blade unit 2 are arranged in an array of rows and columns, are swingably hung on the grid frame 21, and correspond in position to the grid spaces 210. Each blade panel 22 has a connecting end 221 connected to one of the second grid rods 212, and a swing end 222 oppositely below the connecting end 221 and abuttable against the second grid rod 212 which is adjacently below the one of the second grid rods 212. The connecting end 221 of each blade panel 22 can be secured to the one of the second grid rods 212 by using at least one screw, or can be pivotally connected to the one of the second grid rods 212 by using a pivot rod (not shown) and two lugs (not shown) protruding from the one of the second grid rods 212. Of course, the connection between each blade panel 22 and the one of the second grid rods 212 may vary in other embodiments, and is not limited to the aforesaid disclosure.

Each blade panel 22 of this embodiment is a soft thin sheet which can be made from, for example, a fabric, canvas, nylon, rubber, soft plastic or soft polymer material. In actual practice, the material of each blade panel 22 is not limited to the aforesaid disclosure, and any material is acceptable as long as it can be blown open by the wind.

The connecting end 221 of each blade panel 22 is provided with a flat sheet lever made up of a plurality of flexible sheets 223. Each flexible sheet 223 is made of a soft material, such as a high polymer sheet, fabric, canvas, etc. The flexible sheets 223 are bonded or stitched together to form the multi-layered sheet lever. Any material for the flexible sheet 223 is acceptable as long as it can stretch and straighten the blade panel 22 on the grid frame 21.

The counterweight members 23 of each blade unit 2 are respectively disposed on the swing ends 222 of the blade panels 22. In this embodiment, the swing end 222 of each blade panel 22 is folded back upon itself and stitched to define a space for receiving the respective counter member 23. Each counter member 23 is used to increase the weight of the respective blade panel 22 so that each blade panel 22 can be hung and has a sufficient weight to swing.

Each of the counterweight members 23 includes a soft hollow main body 231 and a counterweight fluid 232 accommodated in the main body 231. The main body 231 is a soft waterproof tubular membrane extending along the length of the swing end 22 of the respective blade panel 22.

In this embodiment, the main body 231 of each counterweight member 23 has an inner surrounding wall 2311 and an outer surrounding wall 2312 cooperating with the inner surrounding wall 2311 to define therebetween an accommodation space 2313 for accommodating the counterweight fluid 232. The inner surrounding wall 2311 defines an insertion hole 233 extending along the length of the main body 231. The main body 231 is made of a soft membrane material, such as a soft rubber plastic, a plastic rubber foam, a soft waterproof fabric or a high polymer material, etc., as long as it can provide a function for receiving fluid. The main body 231 can be circular, semicircular or rectangular in cross section. In actual implementation, the material of the main body 231 is not limited to the aforesaid disclosure. As long as it can provide a sufficient weight, and can permit each blade panel 22 to bump against and be stopped by the corresponding second grid rod 212 when each blade panel 22 swings downward, any material is acceptable. The counterweight fluid 232 can be water, alcohol, oil or any other fluid. Among these fluids, water is the most economical, safe and easily accessible one. Further, a bactericide, preservative or any other chemical may be added to the water to prevent growth of bacteria, algae and disease vectors.

Each supporting member 24 can be made from a material, such as a high density foam sponge material, a rubber plastic strip or any other high polymer material, and is inserted into the insertion hole 233 of the main body 231 of a respective one of the counterweight members 23. Each supporting member 24 can be harder than each main body 231 to support the respective counterweight member 23 so that each counterweight member 23 maintains a certain shape. Further, each supporting member 24 can prevent the respective one of the counterweight members 23 from bending during use. However, each supporting member 24 must not be so hard so as to prevent injury to a person when it dropped from the respective counterweight member 23, thereby providing safety in use.

The wind-guiding plate 25 of each blade unit 2 is substantially curved, is connected to the outer end 214 of the grid frame 21 of the respective blade unit 2, and extends in a direction opposite to the rotational direction (T).

Figure 3:
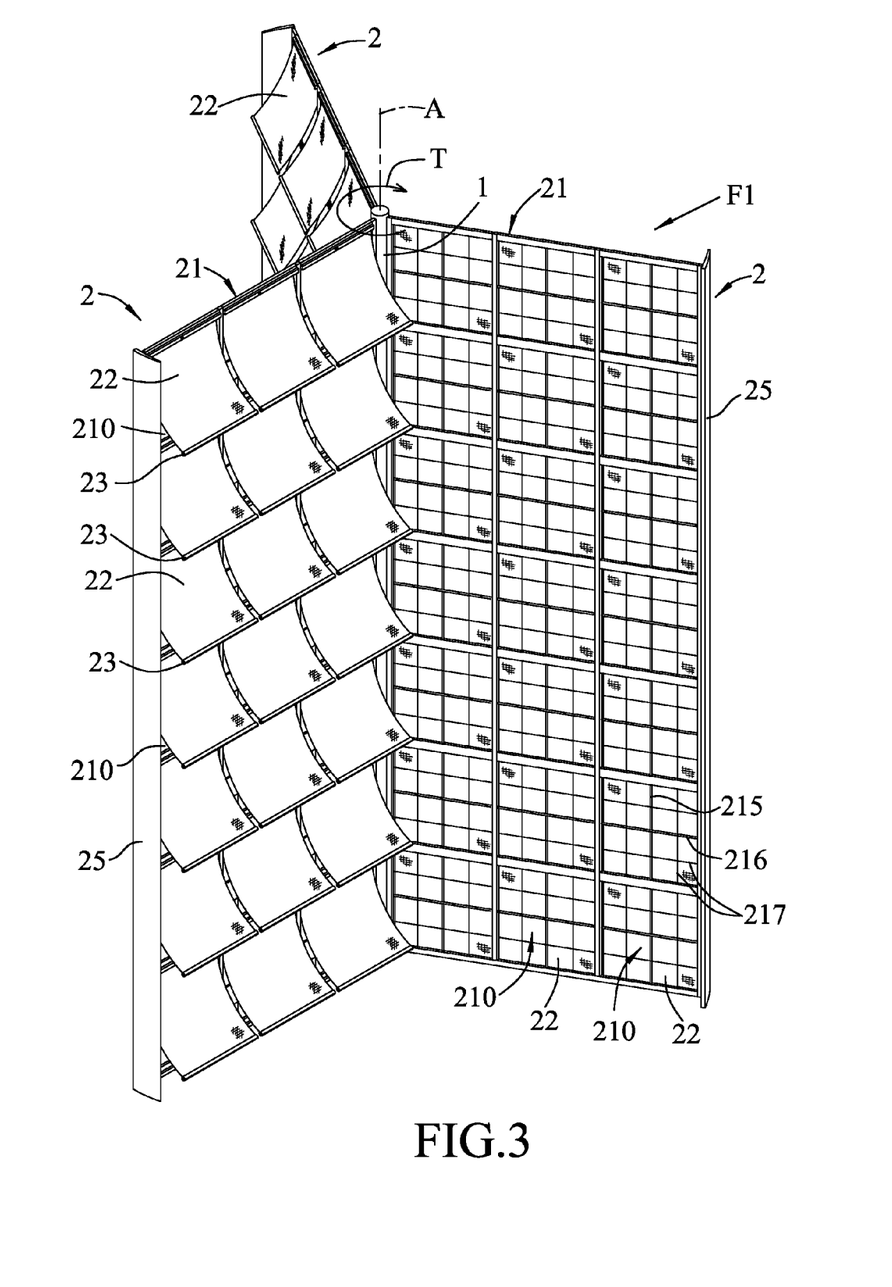
FIG. 3 is a view similar to FIG. 1, but illustrating the blade panels of one of the blade units in the cover position and the blade panels of the other one of the blade units in an open position during rotation of the wind turbine blade assembly of the first embodiment.
Figure 4:
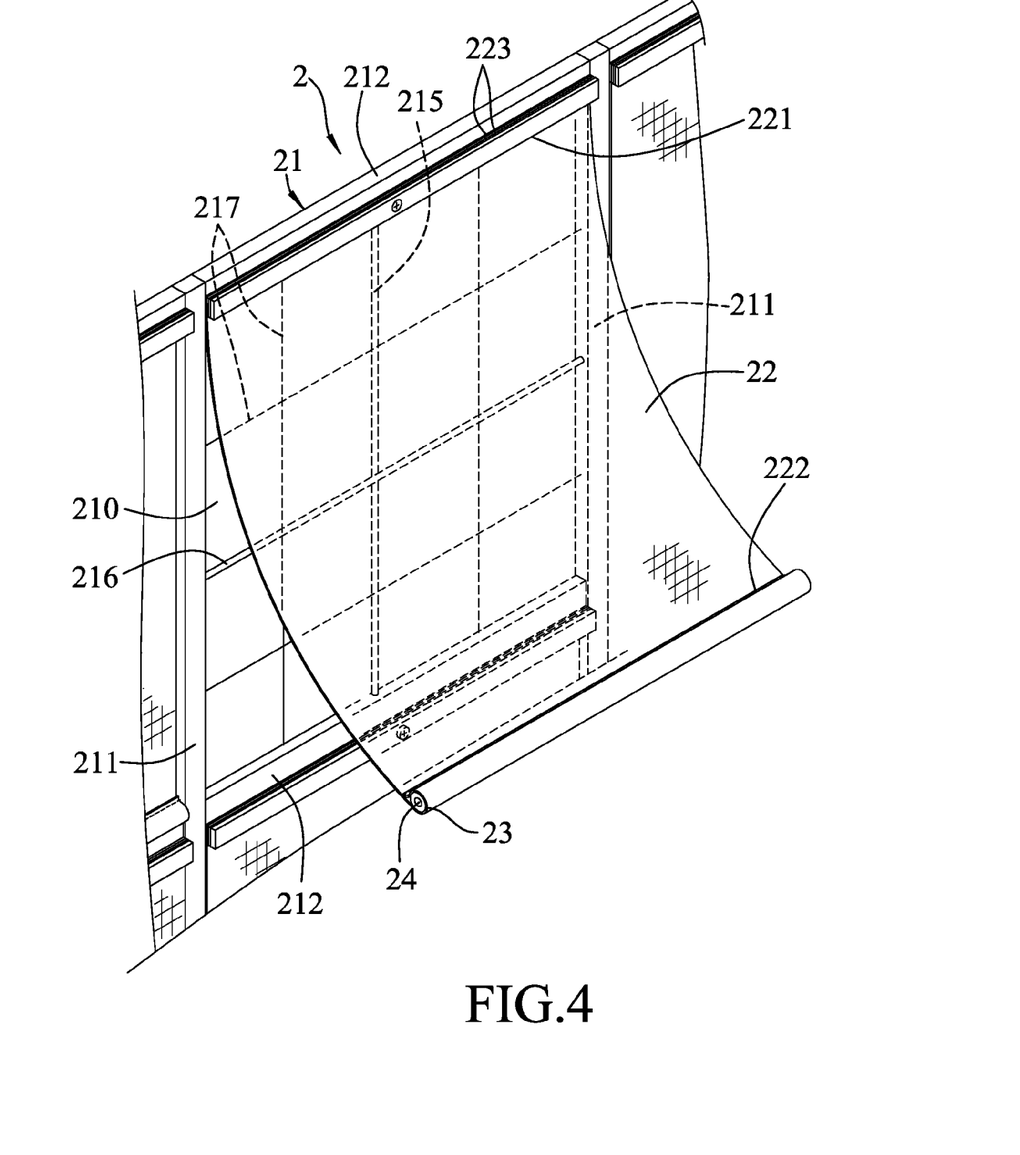
FIG. 4 is an enlarged fragmentary perspective view of the first embodiment, illustrating one of the blade panels in the open position.

During use, each blade panel 22 is swingable between a cover position and an open position. In the cover position, each blade panel 22 covers a respective one of the grid spaces 210, and the swing end 222 of each blade panel 22 abuts against the corresponding second grid rod 212. In the open position, the swing end 222 of each blade panel 22 is moved away from the corresponding second grid rod 212 to uncover the respective one of the grid spaces 210 for allowing a reverse flow of wind to pass through the respective grid space 210. As shown in FIG. 3, the blade panels 22 of one of the blade units 22 are in the cover position, while the blade panels 22 of the other two blade units 2 are in the open position.

Specifically, with reference to FIG. 3, the blade unit 2 located at the right side of the rotary shaft 1 is in an upwind position, while the other two blade units 2 located at the left side of the rotary shaft 1 are in a downwind position. When the blade unit 2 in the upwind position receives a wind force (F1) to rotate in the rotational direction (T), the blade panels 22 thereof are pushed by the wind force (F1) to abut against the grid frame 21 and are blocked by the first and second struts 215, 216 and the auxiliary ribs 217. At this time, the blade panels 22 in the upwind position are in the cover position, cover the respective grid spaces 210, and cooperate with the grid frame 21 to form a windward surface. This enhances the rotational torque, so that the blade units 2 together with the rotary shaft 1 can rotate in the rotational direction (T) when propelled by the wind.

Meanwhile, because the other two blade units 2 receive a reverse wind resistance, the blade panels 22 thereof are blown by the reverse wind to open and place in the open position. The grid spaces 210 of the other two blade units 2 have portions that are not covered by the blade panels 22 to allow the reverse wind to flow therethrough for reducing reverse wind resistance and reverse torque. Thus, the other two blade units 2 have relatively small torque. With the three blade units 2 receiving upwind and downwind wind pressures, the difference in the upwind and downwind wind pressures generates a wind force that propels the blade units 2 to rotate together with the rotary shaft 1 in the rotational direction (T).

To sum up, the wind turbine blade assembly of the advantages:

1. When one of the blade units 2 is in the upwind position, the blade panels 22 thereof are pushed by the wind force (F) to the cover position so as to generate a rotational torque. When the one of the blade units 2 is rotated to the downwind position the blade panels 22 thereof are blown by the reverse wind to the open position to generate a small reverse torque. Hence, because the upwind pressure is greater than the downwind pressure, the rotational torque of the entire wind turbine blade assembly is large, thereby enhancing the use efficiency of wind power.

2. The wind-guiding plate 25 of each blade unit 2 can restrict the flow direction of the wind to maintain the wind force (F) on the blade unit 2 which is in the upwind position, so that when the blade unit 2 receives the wind force (F1) and rotates, it can additionally increase the rotational torque.

3. An article that is distal from the rotary shaft 1 in the radial direction with respect to the axis (A) generally has a fast rotation rate and a large centrifugal force. Thus, the blade panels 22 of each blade unit 2 that are distal from the rotary shaft 1 can be designed with a small size.

4. Additional wind-guiding plates may be provided according to the requirement of the present disclosure.

5. Because the counterweight members 23 of this disclosure are made of soft materials, and the counterweight fluid 232 is filled in each counterweight member 23, this kind of structure that combines the soft material and the liquid to serve as a counterweight member is novel. Even if the counterweight member 23 falls and hits a person, it will not cause injury to that person, thereby enhancing safety in use of the disclosure. In addition, because each blade panel 22 is a soft thin sheet, when it falls and hits a person, similarly, it will not cause injury to that person.

It should be noted that the wind turbine blade assembly of the present disclosure may also be a horizontal wind turbine blade assembly. In this case, the rotary shaft 1 extends along an axis which is horizontal, the first grid rods 211 extend in the horizontal direction, the second grid rods 212 extend in the vertical direction, and the connecting and swing ends 221, 222 of each blade panel 22 are disposed in the vertical orientation. Further, the connecting end 221 of each blade panel 22 is connected to one of the first grid rods 211, and the swing end 222 thereof is located on the other one of the first grid rods 211 which is adjacently below the one of the first grid rods 211. During rotation of the horizontal wind turbine blade assembly, the blade panels 22 in the upwind position similarly receive the wind force and are pushed to the cover position, and when rotated to the downwind position, the blades panels 22 are blown by the reverse wind to the open position.

Figure 5:
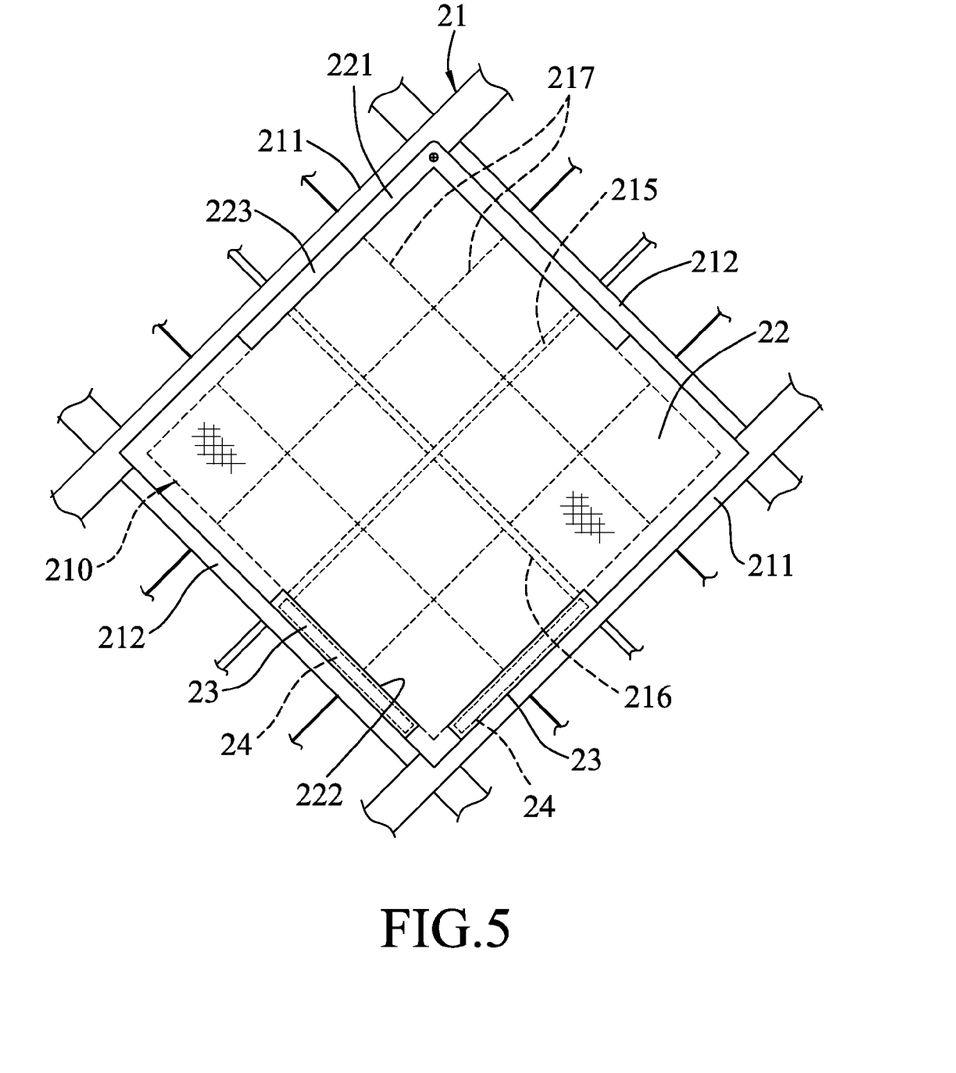
FIG. 5 is an enlarged fragmentary perspective view of a blade unit of a wind turbine blade assembly according to a second embodiment of the present disclosure.

FIG. 5 illustrates a wind turbine blade assembly according to a second embodiment of the present disclosure, which has a structure generally similar to that of the first embodiment. However, in this embodiment, each of the first and second grid rods 211, 211 of the grid frame 21 of each blade unit 2 (see FIG. 1) is arranged to form an acute angle with the rotary shaft 1 (see FIG. 1), and the grid spaces 210 (only one is shown in FIG. 5) are defined by the intersecting first and second grid rods 211, 212. Each grid space 210 has a rhombus shape. Each blade panel 22 has a shape corresponding to that of the respective grid space 210. As shown in FIG. 5, two adjacent sides of the blade panel 22 are secured by a screw to a juncture of one of the first grid rods 211 and an adjacent one of the second grid rods 212, and serve as the connecting end 221. The connecting end 221 is provided with an inverted V-shaped flat sheet lever made up of a plurality of the flexible sheets 223. The material of each flexible sheet 223 has to be semi-soft and semi-hard, so that it can support the blade panel 22 during the swinging movement thereof. The other two adjacent sides of the blade panel 22 are respectively abuttable against the other first grid rod 211 and an adjacent second grid rod 212, and serve as the swing end 222. In this embodiment, two counterweight members 23 are disposed on the swing end 222 of the blade panel 22, and two supporting members 24 are respectively inserted into the counterweight members 23.

Figure 6:
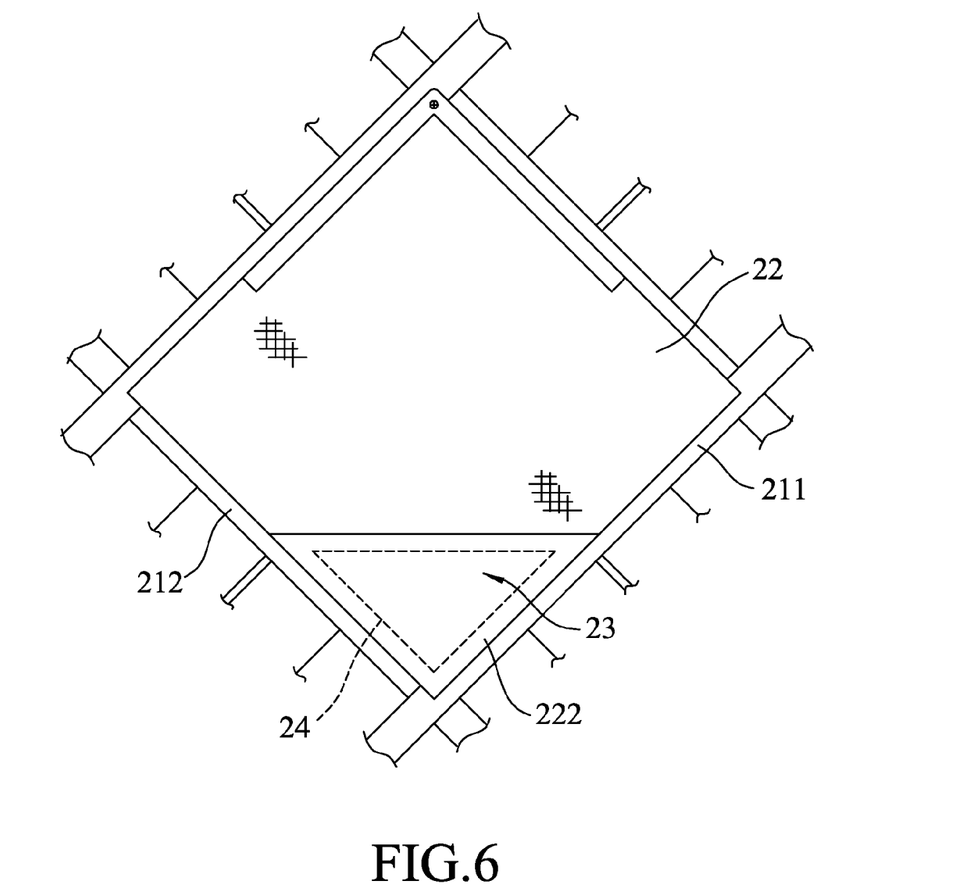
FIG. 6 is an enlarged fragmentary perspective view of a blade unit of a wind turbine blade assembly according to a third embodiment of the present disclosure.

FIG. 6 illustrates a wind turbine blade assembly according to a third embodiment of the pre sent disclosure, which has a structure generally similar to that of the second embodiment. The difference between the second and third embodiments resides in that the counterweight member 23 of the third embodiment has a triangular shape, and may be stitched or adhered to the swing end 222 of the blade panel 22.

Figure 7:
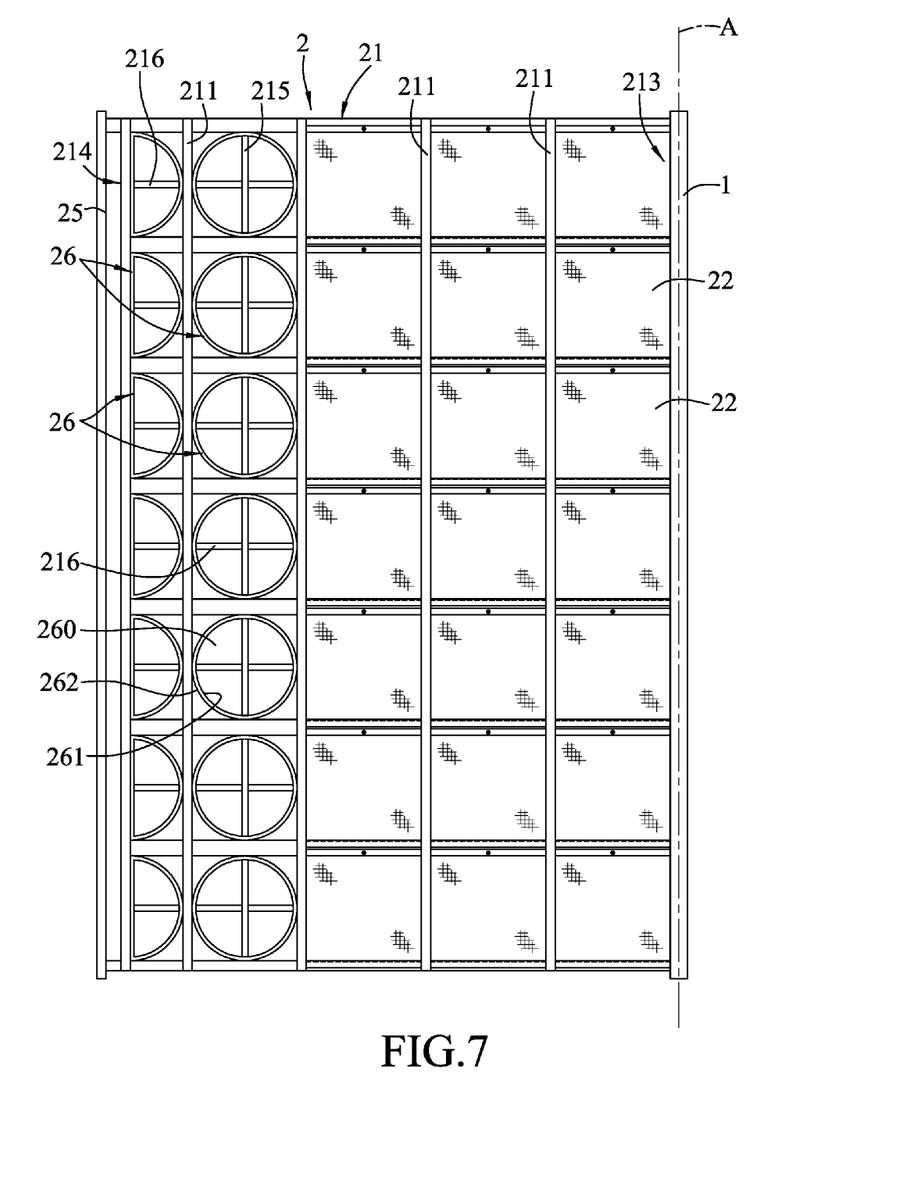
FIG. 7 is a front view of a blade unit of a wind turbine blade assembly according to a fourth embodiment of the present disclosure.

FIG. 7 illustrates a wind turbine blade assembly according to a fourth embodiment of the present disclosure, which has a structure generally similar to that of the first embodiment. The difference between the first and fourth embodiments resides in the structure of each blade unit 2. In this embodiment, each of the blade units 2 further includes a plurality of cup members 26 arranged in an array of rows and columns. The cup members 26 are nearer to the outer end 214 of the grip frame 21 than the blade panels 22. Each cup member 26 is fixed to one of the first struts 215 and one of the second struts 216 that intersects the one of the first struts 215, and has an inner surface 261 that is concaved inwardly and that defines a receiving space 260, and an outer surface 262 opposite to the inner surface 261. The operating principle of the cup members 26 is similar to that described in the applicant's previous patent application, i.e., Taiwanese Patent No. M489201. The structure of the grid frame 21 of each blade unit 2 may be changed according to the arrangement requirement of the cup members 26 and the blade panels 22.

Since an article that is placed distal from the rotary shaft 1 in the radial direction with respect to the axis (A) has a fast rotation rate and a large centrifugal force, the cup members 26 of this disclosure are thus disposed in the outer end 214 of the grid frame 21 to sustain the fast rotation rate and the large centrifugal force.

Reference in the specification to "one embodiment" or "an embodiment" means that a particular feature, structure, or characteristic described in connection with the embodiment may be included in at least an implementation. The appearances of the phrase "in one embodiment" in various places in the specification may or may not be all referring to the same embodiment. Various features, aspects, and exemplary embodiments have been described herein. The features, aspects, and exemplary embodiments are susceptible to combination with one another as well as to variation and modification, as will be understood by those having skill in the art.

This disclosure is not limited to the disclosed exemplary embodiments but is intended to cover various arrangements included within the spirit and scope of the broadest interpretation so as to encompass all such modifications and equivalent arrangements.

What is claimed is:

1. A wind turbine blade assembly comprising:
a rotary shaft extending along an axis and rotatable in a rotational direction about the axis; and
a plurality of blade units connected to said rotary shaft and angularly spaced apart from each other, each of said blade units including
a grid frame connected to said rotary shaft and formed with a plurality of grid spaces,
a plurality of blade panels swingably connected to said grid frame and corresponding in position to said grid spaces, each of said blade panels having a connecting end connected to said grid frame, and a swing end opposite to said connecting end, each of said blade panels being swingable between a cover position, where each of said blade panels covers a respective one of said grid spaces and said swing end of each of said blade panels abuts against said grid frame, and an open position, where said swing end of each of said blade panels is moved away from said grid frame to uncover the respective one of said grid spaces,
a plurality of counterweight members respectively disposed on said swing ends of blade panels, each of said counterweight members including a soft hollow main body and a counterweight fluid accommodated in said main body, said main body of each of said counterweight members being tubular and having an inner surrounding wall and an outer surrounding wall cooperating with said inner surrounding wall to define therebetween an accommodation space for accommodating said counterweight fluid, said inner surrounding wall defining an insertion hole, and
a plurality of soft supporting members each of which is inserted into said insertion hole in said inner surrounding wall of said main body of a respective one of said counterweight members.

2. The wind turbine blade assembly as claimed in claim 1, wherein said grid frame of each of said blade units includes a plurality of first grid rods that extend in a direction parallel to said rotary shaft and that are spaced apart from each other in a radial direction with respect to the axis, and a plurality of second grid rods that extend in the radial direction with respect to the axis and that are spaced apart from each other in an axial direction with respect to the axis, said first grid rods and said second grid rods cooperatively defining said grid spaces.

3. The wind turbine blade assembly as claimed in claim 2, wherein said grid frame of each of said blade units further includes a plurality of first and second struts, each of said first struts and a respective one of said second struts being disposed in a corresponding one of said grid spaces for blocking a corresponding one of said blade panels.

4. The wind turbine blade assembly as claimed in claim 3, wherein each of said first struts intersects the respective one of said second struts.

5. The wind turbine blade assembly as claimed in claim 1, wherein said grid frame of each of said blade units includes an inner end connected to said rotary shaft, and an outer end that is opposite to said inner end and that is distal from said rotary shaft, each of said blade units further including a wind-guiding plate that is connected to said outer end of said grid frame and that extends in a direction opposite to the rotational direction.

6. The wind turbine blade assembly as claimed in claim 1, wherein said grid frame of each of said blade units includes an inner end connected to said rotary shaft, and an outer end that is opposite to said inner end and that is distal from said rotary shaft, each of said blade units further including a plurality of spaced-apart cup members arranged in an array and proximate to said outer end of said grid frame.

7. The wind turbine blade assembly as claimed in claim 1, wherein said connecting end of each of said blade panels is provided with a plurality of flexible sheets.

* * * * *